Aug. 26, 1941.  E. MYERS ET AL  2,253,800
MEDICINAL LOZENGE AND PROCESS OF PRODUCING THE SAME
Filed Jan. 3, 1936   2 Sheets-Sheet 2
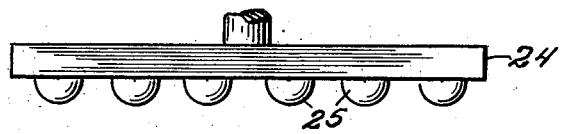
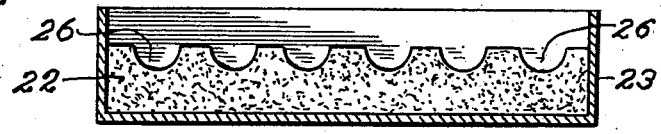
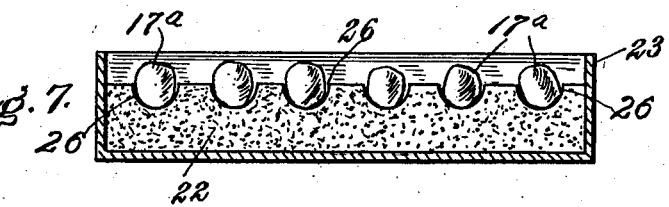
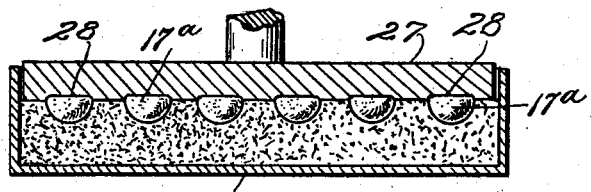
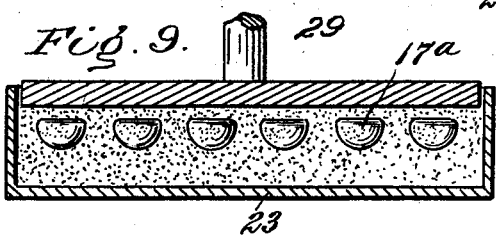
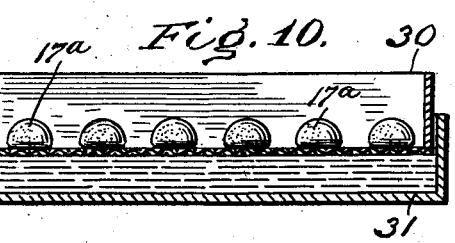
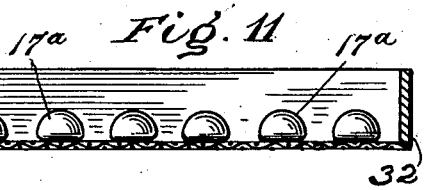
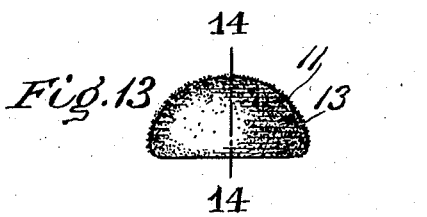
INVENTORS:
ELIZABETH MYERS
JULIUS ALSBERG
ADOLPH GOTTFURCHT
BY Conrad A. Dieterich
  their ATTORNEY.

Patented Aug. 26, 1941

2,253,800

UNITED STATES PATENT OFFICE 2,253,800

MEDICINAL LOZENGE AND PROCESS OF PRODUCING THE SAME

Elizabeth Myers, Mount Vernon, Julius Alsberg, Tompkins Corners, and Adolph Gottfurcht, Brooklyn, N. Y.; said Alsberg and said Gottfurcht assignors to said Myers Application January 3, 1936, Serial No. 57,346

9 Claims. (Cl. 167—82)

The invention relates to improvements in medicinal compositions in tablet or lozenge form for alleviating throat irritations, and in process for the production thereof, and the same has for its object to produce an efficacious, palatable tablet or lozenge of simple composition and desirable shape capable of being readily dissolved in the mouth.

Further, said invention has for its object to produce a tablet of the character specified in which the center or core thereof is a plastic, oleaginous substance having any desired medicinal properties.

Further, said invention has for its object to produce a tablet or lozenge of the character specified in which the plastic, oleaginous core thereof is enclosed by a relatively strong shell of soluble composition capable of withstanding the usual handling.

Further, said invention has for its object to produce a tablet of the character specified in which the oleaginous core thereof is in a form capable of being uniformly diffused together with the other constituents of the tablet upon dissolution thereof in the mouth.

Further, said invention has for its object to produce a tablet of the character specified in which the plastic component thereof is encased by a coating including sugar deposited as a relatively strong, coherent, crystalline mass.

Further, said invention has for its object to provide a novel process of producing said tablets or lozenges.

Other objects will in part be obvious and in part be pointed out hereinafter.

To the attainment of the aforesaid objects and ends our invention consists in the novel features of construction, and in the combination, connection and arrangement of parts, and in the successive steps constituting the novel method hereinafter more fully described and then pointed out in the claims.

In the accompanying drawings—

Figs. 6 to 9 are similar sectional views illustrating the apparatus employed in performing the successive steps in molding the measured charges;

Figs. 10 to 12 are similar sectional views illustrating the apparatus for performing the final steps in the production of the finished product;

Fig. 13 is a side elevation of one form of product made according to and embodying our said invention, and Fig. 14 is a sectional view of the finished product on the line 14—14 of Fig. 13.

Figure 1:
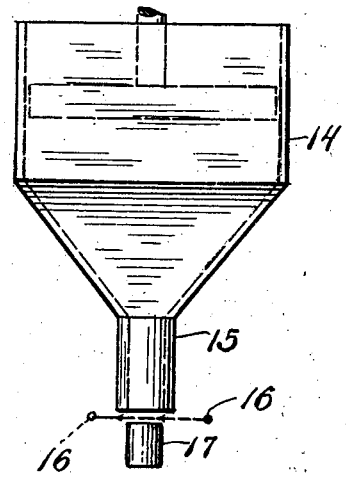
Figure 1 is an elevation of an apparatus for delivering measured quantities or charges of the emulsified constituent of our product.

Referring to the drawings, the tablet or lozenge, as produced in accordance with the method of the invention, includes a medicated, plastic core 10 encased by a relatively hard soluble shell 11. The shell 11 includes an inner coating layer 12 composed predominantly of sugar and formed, as hereinafter described, about the plastic core 10, as a coherent, crystalline mass serving as a reinforcing structure for the plastic core to permit of the handling of the units or elements during the later stages of the process in applying the outer coating or layer 13 thereto.

The coating 13 has a composition, as hereinafter described, which is more resistant to the erosive effects to which the tablets are subjected in the course of manufacture and handling than the sugar coating 12 is, and hence serves as a protective envelope for said inner coating 12, and to supplement or combine with the same to form a hard, strong outer shell or enclosure.

The center or core 10 preferably includes an oleaginous substance having medicinal properties, such as petroleum jelly (petrolatum) which has a soothing effect on the throat and related organs. The petrolatum is preferably incorporated with other substances to form a relatively stiff emulsion of a consistency rendering the mass capable of being measured out and separated into units or elements of predetermined size, and of being readily conformed to and retained in the desired shape. As one example, an emulsion of the following composition has been found satisfactory for the purpose, viz:

| | Parts by weight |
|---|---|
| Petroleum jelly | 53 |
| Gum arabic | 7 |
| Corn starch | 1 |
| Cane sugar | 21.5 |
| Water | 20 |

To the constituents above enumerated may be added, if so desired, nominal or slight quantities of flavoring material, such as oil of peppermint, and a suitable coloring matter, and any desirable medicament such as eucalyptus, menthol, etc. The sugar and water content of the above mixture are in proportions to insure the formation of uniformly strong sugar coatings or films 12 about the pellets in the manner hereinafter described without increasing the sugar content to an extent which will deaden the soothing effects of the petrolatum constituent. The starch employed assists in controlling the consistency of the mass, and the amount thereof employed is close to the maximum that can be used without interfering with the formation of the sugar coating 12.

The method of preparing the filler emulsion 10 constituting the body or core of the lozenge is substantially as follows:

Fifteen (15) parts of water are measured out and transferred to a suitable container and heated to the boiling point, and seven (7) parts of ground gum arabic added thereto and stirred until the same is fully dissolved. Thereupon one (1) part of corn starch is suspended in five (5) parts of cold water, and this suspension is added to the hot gum arabic solution and agitated to mix the same. The mixture is again brought to the incipient boiling stage, and twenty-one and a half (21.5) parts of cane sugar added thereto, and the mass stirred until the sugar is dissolved. The mixture is then allowed to cool to room temperature.

Next fifty-three (53) parts of white petroleum jelly, having the properties of "Vaseline" are weighed into a receptacle, and a small amount (about 0.5 cc.) of oil of peppermint added for flavoring and the same mixed by stirring.

The solution containing the gum arabic, sugar, etc., is then placed in a fairly large sized mortar and the petroleum jelly, in cold state, containing the flavoring or other material gradually added and constantly ground or otherwise milled after each addition of the petroleum jelly, and the grinding continued until a thorough dispersion of the oil phase in the aqueous phase is effected. The emulsion obtained is highly viscous at ordinary room temperature and the plasticity thereof is such as to permit handling in the succeeding steps of the process.

When the composition is flavored with oil of peppermint, as above specified, it is desirable to give the composition a green color. For this purpose a stock solution may be prepared by dissolving "certified" dyes, for example, 1.0 gr. of Brilliant Blue in 40 cc. of water (2.5% solution), and dissolving about 4 gr. of Naphthol Yellow in 40 cc. of water (10% solution), and then mixing 5 cc. of the Brilliant Blue solution with ¾ cc. of the Naphthol Yellow solution. This combination will produce an intense green color, and the required amount thereof, may be added to the foregoing gum arabic-sugar-starch solution to color the same. Other coloring solutions, and different amounts thereof may, of course, be used according to the intensity of the shade and color desired in the finished product.

Figure 2:
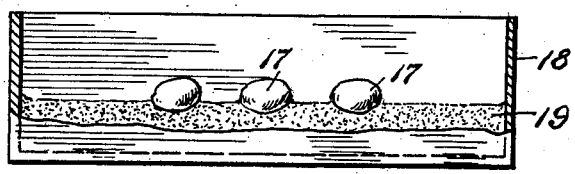
Figs. 2 to 5 are horizontal sectional views of the utensils and apparatus employed in carrying out the successive steps of coating the measured charges with sugar.
Figure 3:
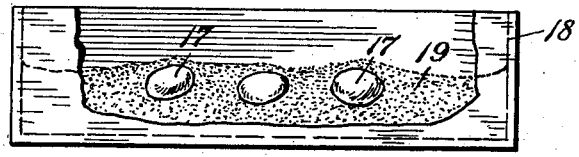
Figure 4:
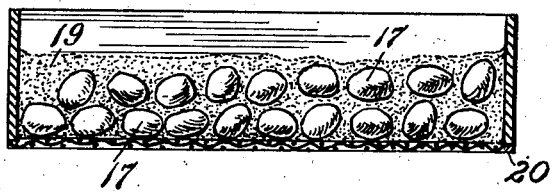
Figure 5:
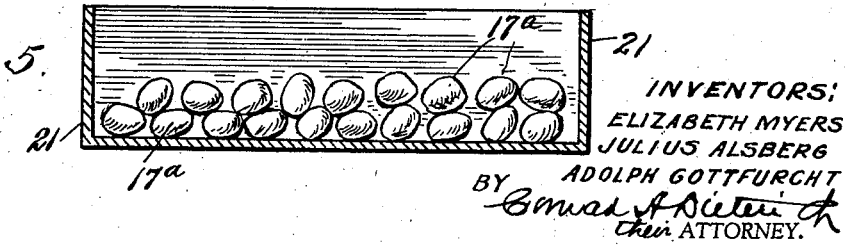

The emulsion is then placed in a hopper 14 (Fig. 1) having a nozzle 15 and a wire 16 actuated by suitable means to sever the emulsion in duly measured charges or quantities 17. The emulsion is preferably supplied to the nozzle 15 by pressure maintained within the hopper. The separate charges 17 are dropped into a pan 18 (Fig. 2) containing powdered confectioners sugar 19. In dropping the charges assume a more or less spherical shape (Fig. 2), and after being received in the pan of sugar more powdered confectioners sugar is sifted into the pan and the charges or pellets 17 completely covered (Fig. 3). The charges or pellets 17 are then dumped into a sieve 20 and shaken until the sugar not adhering to the charges has been removed (Fig. 4). The sugar-coated charges 17ᵃ of emulsion thus obtained are then emptied into a suitable pan 21 (Fig. 5) preparatory to the next operation.

Next a quantity of powdered confectioners sugar 22, or other absorbent material, such as starch, or preferably, such sugar containing a small amount of starch (usually about 3%) is placed in a flat pan 23, and the sugar evened out into a layer about one half inch thick, and the surface of the sugar subjected to the action of a die 24 (Fig. 6) consisting of a flat plate having numerous equally-spaced, semi-spherical projections 25 upon its underside. The die 24 is then pressed into the layer of sugar and starch and semi-spherical recesses or depressions 26 formed in said layer corresponding to the projections 25 on the plate 24.

The sugar coated charges or pellets 17ᵃ, as shown in Fig. 7, are now placed into the recesses or depressions 26 which correspond thereto in volume, and the same then subjected to pressure of a presser member 27 having shallow recesses 28 therein to conform the pellets 17ᵃ to the shape of the recesses 26 and to form the slightly rounded bases of the charges 17, (Fig. 8). The presser 27 is then withdrawn, sugar dusted over the thus treated charges or pellets 17ᵃ, until the same are covered to a depth of about one-quarter inch, and the entire mass then subjected to pressure of a flat plate 29 (Fig. 9) to fully shape the charges or pellets and to bring the sugar into intimate and firm contact with the molded charges 17ᵃ.

The charges are then permitted to age in the molds at room temperature for a period of about three days to allow the thin crystalline films 12 of sugar to form about the charges 17ᵃ. During such aging, apparently, the sugar-containing solution diffuses from the interior of the emulsion to the surface of the pellets where the moisture is absorbed by the sugar or other material of the molds. The sugar from the solution crystallizes with the sugar previously powdered upon the pellets, and with sugar from the molds, to form strong uniform primary coatings 12 about the pellets.

At the end of said time the entire mass is screened either through a coarse sifter or preferably in a rotating cylinder which will at the same time tumble the elements and thereby remove, as much as possible, of the loose sugar from the surface thereof. As thus prepared, the sugar coating 12, which has crystallized out during the aging in the molds, is sufficiently strong to withstand reasonable handling without danger of fracturing the same. In the sifting operation above described, care should be exercised not to tumble the elements or pellets too much as it might tend to unduly weaken or reduce the thickness of the coating.

It has been found that the sugar coating 12 of the pellets or lozenges, after removal from the molds, always gains considerably in strength on allowing the pellets to remain exposed to the air for a few days. It is, therefore, desirable (though not absolutely necessary) to permit the lozenges to age for a reasonable length of time, e. g. a few days. The pellets with the crystalline sugar enclosures thereon are now ready for the application of the coating solution which is composed of sugar, gum arabic and starch in proportions to prevent such solution, when applied, from appreciably dissolving or otherwise affecting the sugar coatings on the pellets. Preferably, however, the flowing and the spreading qualities of the solution are controlled to insure the formation of thin uniform coatings by reducing the amount of sugar employed and including in the solutions as a substitute for excess sugar, ingredients, such as gum arabic, corn starch or both.

The outer coating is of composition which readily dissolves in the mouth without becoming gummy. The gum arabic prevents the sugar from crystallizing and imparts a glossy appearance to the coating when dry.

In forming the outer coating four hundred and eighty (480) parts of water are added to one hundred and thirty-eight (138) parts of powdered gum arabic, and the mixture stirred until the gum is completely dissolved. Eleven and one half (11.5) parts of corn starch suspended in thirty-eight (38) parts of cold water are added to the hot gum arabic solution with constant agitation. The solution is now brought to incipient boiling, during which time it is constantly stirred, and four hundred and eighty-three (483) parts of cane sugar stirred into the same until the sugar is wholly dissolved. The mixture is then allowed to cool to room temperature.

This solution may be colored as desired. A preferred green color may be provided by using a mixture of Guinea Green and Napthol Yellow, or Guinea Green plus Tartrazine. A five per cent (5%) stock solution of Guinea Green, and a ten per cent (10%) solution of either Naphthol Yellow or Tartrazine may be prepared. The proportions of the coloring components to be added to the coating solution depend, of course, upon the intensity of the color desired in the finished product. If the emulsion within the lozenge has not been colored sufficiently intense then it is desirable to have the coating solution quite strongly colored, otherwise the color of the finished product may be too faint. A more intense color considerably improves the appearance of the finished product.

The sugar-coated pellets, freed as much as possible of adhering sugar, are then placed on a wire screen tray 30 duly spaced apart. The screen should have a rather coarse mesh, e. g. about ten meshes to the inch, and should first be dipped into the coating solution in the receptacle 31 before placing the pellets thereon. The tray with the pellets thereon is now dipped into the coating solution (Fig. 10) sufficiently deep to immerse the pellets part way—about one-eighth (⅛) inch; this serves quite effectively to coat the bottoms of the pellets. After this preliminary dipping, and even while the same is being performed, the tops of the pellets should be flushed with a larger volume of the coating solution. It is important to have the coating solution adhere fully to any spots on the pellet where there is loose sugar, as the product will otherwise show white specks after drying thus indicating that the said spots were not wet by the coating. This flushing operation may have to be repeated several times to insure the complete coating of the product.

Instead of applying the coating solution by spraying the pellets as above described, the same may be placed upon the wire trays and the trays then repeatedly immersed in the coating solution.

After the coating operation has been completed, the wire tray is allowed to drain for a short period of time, about five (5) minutes, to permit the excess of solution to drain from the upper surface of the lozenge and collect on the under surface of the screen tray from which it may be removed by a suitable suction operated nozzle.

Finally a screen tray 32 (Fig. 11), having say, 14–16 meshes to the inch is prepared by dipping same in molten cocoa-butter, removing and shaking off the excess and permitting the cocoa-butter to harden. The coated lozenges, after removal of excess coating solution, as above described, are then transferred to the coated screen 32 in such a manner that the flat side of the hemispherical lozenge rests on the screen. During the transfer (which may be done by means of a spatula or other suitable instrument), care should be taken in handling the lozenges, as they are naturally not very strong when in a wet condition.

In order to avoid softening of the sugar coating, especially in warm weather, it may be necessary to subject the lozenges for the first portion of the drying period to a blast of air.

The lozenges are then allowed to dry completely. This will take about 8–12 hours. (The bottom of the lozenges naturally will dry out slower than the parts which are exposed freely to the air.)

After drying, it will be found that the lozenges still adhere quite firmly to the coated wire screen. In order to remove them, the screen is turned upside down over a receiving tray or support 33 (Fig. 12) and the underside of the screen (now uppermost) is slightly heated with a warm blast of air, sufficiently to melt the cocoa-butter which melts at 98° F. When this is done, the coated lozenges will either fall off by their own weight or fall off by tapping the tray. The lozenges are now finished and are ready for placing in containers.

Having thus described our said invention what we claim and desire to secure by Letters Patent is:

1. The method of producing a lozenge of the character described which includes taking an oleaginous body, emulsifying the same with a solution containing gum arabic, corn starch and sugar to convert said body into a plastic mass, separating said mass into separate elements of uniform volume, applying to the surface of said elements sugar coacting with said elements to form therewith a soluble primary coating, shaping said elements to desired form, and applying to said primarily-coated elements gum arabic, corn starch and cane sugar in solution to combine with said primary coating and form a soluble outer coating.

2. The method of producing a lozenge of the character described which includes emulsifying an oleaginous substance in a continuous phase containing sugar to form a plastic core, coating said plastic core with powdered sugar, shaping said sugar coated core in a mold composed of sugar, and forming a crystalline film from said sugar about said core by aging the same in said mold.

3. The method of producing a lozenge of the character described which includes forming a plastic mass composed of petrolatum dispersed as an emulsion in water containing sugar, subdividing said mass into pellets, coating the wet pellets with dry comminuted sugar, shaping said pellets in a mold composed of absorbent material, aging said pellets in said mold to allow the formation of crystalline sugar coatings about said pellets, and applying a coating solution to said pellets.

4. The method of producing a lozenge of the character described which comprises forming a dispersion of an oleaginous substance, in water containing sugar and an emulsifying agent, the ingredients being relatively proportioned to form a plastic mass, separating said mass into elements of predetermined volume, applying to the surface of said elements dry, comminuted sugar, shaping said elements to desired form, forming from the sugar present in and on said elements a crystalline coating of sugar about each element, applying a coating solution to said elements, and drying the same.

5. The method of producing a lozenge of the character described which includes taking a solution of gum arabic, starch and sugar in water, incorporating therein by milling a quantity of oleaginous substance, to form a plastic emulsion, sub-dividing said mass into separate elements, coating said elements with powdered sugar, shaping said elements in a mold composed of sugar, aging said elements in said mold to form enclosures of crystalline sugar about the same, coating said elements with a solution containing substantially the same ingredients as said first mentioned solution, and drying said coated elements.

6. The method of producing a lozenge of the character described which includes forming a plastic emulsion composed of petrolatum, about 53 parts by weight, sugar, about 21.5 parts by weight, stabilizer and filler, about 8 parts by weight, and water about 20 parts by weight, sub-dividing the mass into pellets, coating the wet pellets with sugar, shaping the pellets in a mold composed of sugar, aging said pellets in the mold to form crystalline sugar coatings about the same, and applying coating material to said pellets.

7. The method of producing a lozenge of the character described which includes forming an emulsion in water containing sugar in solution to produce a viscous mass, forming pellets therefrom, coating said pellets with sugar in powdered form, shaping said pellets in a mold composed of material capable of absorbing moisture from said pellets, inducing crystallization of said sugar about said pellets as said mold absorbs moisture therefrom to form envelopes about said pellets resistant to handling, and applying liquid coating to said pellets after removal thereof from the mold.

8. An article of the character described including petrolatum dispersed in an aqueous phase containing substances including sugar in quantity substantially less than that of the petrolatum to slightly sweeten the same and constituting a viscous mass, said mass being molded to shape and constituting a core or body, and a relatively hard, thin, uniform coating enclosing said viscous core and serving to hold the core to produced shape, said coating having a composition rendering the same soluble to a degree commensurate with the dispersiveness of the core.

9. An article of the character described including an oleaginous substance dispersed in an aqueous phase to form an emulsion, sugar in said emulsion in an amount substantially less than that of the oleaginous substance and in solution in an unsaturated state to form with the emulsion a readily dispersed, viscous mass, said mass being molded to shape and constituting a core or body, and a coating composed predominantly of sugar together with gum arabic and starch in less amounts forming a relatively strong uniformly thin enclosure about said viscous core for holding said core to produced shape, said coating being soluble to a degree commensurate with the dispersiveness of said core.

ELIZABETH MYERS.
JULIUS ALSBERG.
ADOLPH GOTTFURCHT.